(12) United States Patent
Singhania

(10) Patent No.: US 10,936,682 B2
(45) Date of Patent: Mar. 2, 2021

(54) SYSTEM AND METHOD OF RECEIVING, MANAGING, CONTROLLING, SAVING AND SHARING INFORMATION (CONTENT) OF SOCIAL MEDIA PLATFORM AND OTHER APPS

(71) Applicant: Harsh Vardhan Singhania, Columbus, OH (US)

(72) Inventor: Harsh Vardhan Singhania, Columbus, OH (US)

( * ) Notice: Subject to any disclaimer, the term of this patent is extended or adjusted under 35 U.S.C. 154(b) by 541 days.

(21) Appl. No.: 15/725,927

(22) Filed: Oct. 5, 2017

(65) Prior Publication Data

US 2018/0107745 A1 Apr. 19, 2018

(30) Foreign Application Priority Data

Oct. 6, 2016 (IN) .............................. 201611034293
Oct. 26, 2016 (IN) .............................. 201611036726

(51) Int. Cl.
*G06F 16/00* (2019.01)
*G06F 16/9535* (2019.01)
*G06Q 50/00* (2012.01)
*G06F 8/61* (2018.01)

(52) U.S. Cl.
CPC ......... *G06F 16/9535* (2019.01); *G06Q 50/01* (2013.01); *G06F 8/61* (2013.01)

(58) Field of Classification Search
CPC ............... G06F 16/9535; G06F 9/4451; G06F 21/6245; G06F 21/62; G06F 8/61; G06F 2221/2113; G06Q 50/01
See application file for complete search history.

(56) References Cited

U.S. PATENT DOCUMENTS

| 2002/0169998 | A1* | 11/2002 | Largman | G06F 11/1417 714/25 |
|---|---|---|---|---|
| 2008/0263103 | A1 | 10/2008 | McGregor | |
| 2012/0010995 | A1* | 1/2012 | Skirpa | G06F 40/106 705/14.49 |
| 2017/0185800 | A1* | 6/2017 | Bentley | G06F 3/0481 |
| 2017/0285914 | A1* | 10/2017 | Ellbogen | G06F 16/957 |

* cited by examiner

*Primary Examiner* — Alexander Khong
(74) *Attorney, Agent, or Firm* — Craft Chu PLLC; Andrew W. Chu

(57) ABSTRACT

A system and method of receiving, managing, controlling, saving and sharing information (content) of social media platforms and other apps is configured for a device. The method includes the steps of: installing the application; creating a profile of a user; providing personal details of the user; verification of the user; determining appropriate settings for the profile; accessing distinct social media platforms; copy relevant data from the platforms; and saving or sharing data. The system for storing and sharing data includes a memory for storing files and database; a server; and a processor for processing files and database. The system includes features of: pop up/swipe down manager; reminder, archive or calendar; multi-share operation; search; sort and filter; tag; folder; attachments; auto-links; and multi operations.

11 Claims, 10 Drawing Sheets

SYSTEM AND METHOD OF RECEIVING, MANAGING, CONTROLLING, SAVING AND SHARING INFORMATION (CONTENT) OF SOCIAL MEDIA PLATFORM AND OTHER APPS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a method and system of receiving, managing, controlling, saving and sharing information (content) of social media platforms and other apps. More particularly, the present invention relates to a method of storing and sharing data by way of an application configured for a device.

2. Description of Related Art Including Information Disclosed Under 37 CFR 1.97 and 37 CFR 1.98.

Sharing of information or data between a sender and a receiver is an age-old practice. The information or data may be shared in different ways and between different groups of people. With the advancement of technology, the information sharing process has simplified to great extent. The information or data may be shared from one-to-one, one-to-many, many-to-many and many-to-one. Nowadays people connect with other people having similar personal interests or with office colleagues through social networking platforms. Such platforms allow a person to share and receive information from other people as well as to join and participate in different groups.

There are various social media networking websites and applications available that include Facebook, Twitter, WhatsApp, Instagram, LinkedIn and many more. Such applications provide with different features enabling the users to connect, communicate and share information with each other in an uncomplicated manner. With the passage of time, such social networking platforms develop features that are better than the existing features in order to provide an easy and efficient way of communicating and social interaction amongst different groups of society. Moreover, a platform that is user friendly and provides for proper information security is preferred. Such a method and system has been disclosed in US20080263103A1.

BRIEF SUMMARY OF THE INVENTION

Said invention relates to a method for managing digital assets, the steps comprising: recognizing a new digital asset; determining a tag associated with said digital asset; and associating said digital asset with a collection of digital assets according to said tag; whereby digital assets (a first digital asset, a second digital asset, a third digital asset, a fourth digital asset) with similar tags (a first tag) may be quickly sorted by choosing a filter for said tag. Said invention also relates to a method for managing digital assets, the steps comprising: recognizing a new digital asset, said digital asset selected from the group consisting of audio files, audio/video media files, digital asset containers, digital media files, directories, disk drives, e-mails; files, folders, instant message logs, pictures, removable storage media, video files, voice mails, webpages, webpage URLs, and combinations thereof; determining a tag associated with said digital asset; and associating said digital asset with a collection of digital assets according to said tag such that digital assets with similar tags may be quickly sorted by choosing a filter for said tag; whereby said digital asset is organized and available in the future to a user.

However, such method or system is more time and resource consuming. On smartphones, usually the mechanism to save text from any app is either to copy the data and paste it elsewhere, or take a screenshot which would be saved in the form of an image. While doing copy paste, one needs to minimise the app, open the app where one can paste the data which usually takes 11-12 taps to complete the operation and takes a long time (up to one minute each time). With screenshots, it takes a lot of space and one cannot search for it as it's an image. Such Copy Paste also forces to interrupt the reading process, resulting in disruption. The present invention relates to a method and system that overcomes the disadvantages of the prior art by way of providing novel mechanisms and options for storing and sharing of information or data. Also, the instant invention provides for a proper mechanism for management of security of information or data being shared. Another advantage is efficient resource utilization and time saving.

OBJECTIVE OF THE INVENTION

To overcome the drawback of the prior art, the present invention involves technical features to save time and provides efficient handling. When content is selected and copy pressed, it triggers a background service automatically. A POP-UP window opens (or a swipe down option gets activated) and the User can save the content efficiently in an organised manner through this app and avoid the burden of spending time to copy-paste manually etc as well as avoids unnecessary interruption at work or reading. It also saves space as it text and not an image, like a screen shot; offers not only complete Search options but also various Filters, Sort and other tools to find/manage the content more efficiently.

The objective of the present invention is to provide a one stop solution to archive (save), organize, analyse, format, export, print or share data directly from within the various social networking platforms by enabling the users to select and save the information or data so as to be able to use it in the future.

Another objective of the present invention is to provide a mechanism allowing the user to directly save or share the information or data across multiple social networking platforms in a single click.

Yet another objective of the present invention is to provide a mechanism for creating a PDF file of the information saved or shared as well as merging the contents of the information or data saved or shared.

Another objective of the instant invention is to provide end to end encryption for security and privacy of the information or data saved or shared across various social networking platforms.

The present invention achieves the objective by employing a method and system of storing, managing and sharing of information or data across different social networking platforms (a first social networking platform, a second social networking platform). Said method and system provides an easy and efficient end to end solution for social media content management across all platforms and different operating systems.

DETAILED DESCRIPTION OF THE INVENTION

Figure 1:
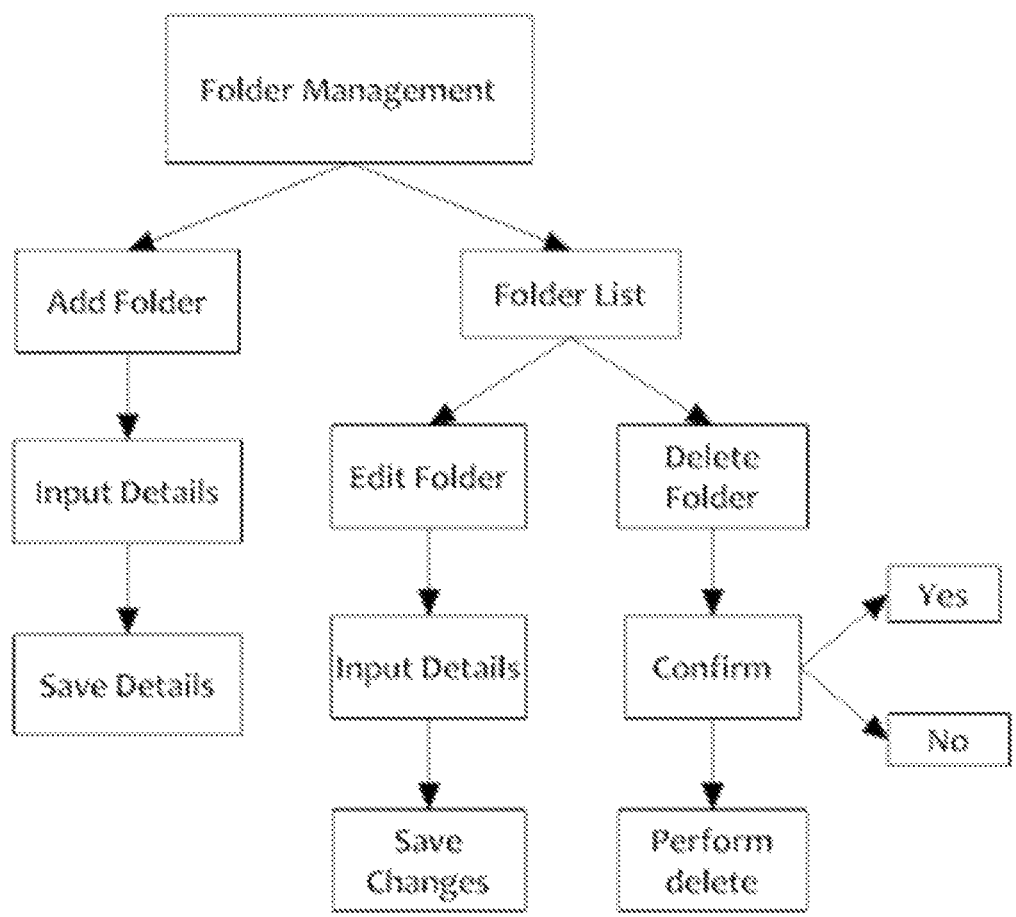
FIG. 1 is a schematic view of an embodiment of the present invention, illustrating folder management in the application.

The present invention relates to a method of storing and sharing data in an application configured for a device, said method comprising the steps of: installing said application; creating a profile of a user on said application; providing personal details of said user; verification of the user; determining appropriate settings for said profile; accessing distinct social media platforms; copy relevant data from said platforms; and saving or sharing said data; characterized in that a pop up/swipe down appears each time said user save the data in said device.

The present invention also relates to a system for storing and sharing data, comprising of features: pop up/swipe down manager; reminder, archive or calendar; multi-share operation; search; sort and filter; tag; folder; attachments; auto-links; multi operations; wherein said system is configured to save and share said data by way of appearance of a pop up/swipe down window in one click. Said application uses hardware or memory for storing files and database. Since the data is stored on device on which application is used as well as on server that runs on an Operating system, hardware of both hand-held device and server are utilized. Hardware specifications for phone can vary based on models, such as, android and iOS platforms and likewise OS are supported. Underlying hardware of server are a processor, memory among others. Unique popup feature uses pasteboard feature of Operating system to get data from phone once copy event is triggered. Data gets copied from pop-up on successful saving of data.

According to a preferred embodiment of the invention, the application is designed to run on a mobile operating system and may be downloaded from a public mobile application store including, but not limiting to, Android and iOS.

According to another preferred embodiment of the invention, the user may create a profile by sign up in the application by means including, but not limiting to, Facebook and Email. According to yet another preferred embodiment of the invention, the personal details of the user that are required to be provided include, but not limited to, Name; Email ID; 10 digit mobile number; Gender; Country; and City. According to a preferred embodiment of the invention, the verification of the user is performed by sending a verification code to the Email ID of the user provided by said user and entering the said verification code in the application. The verification process completes the creation of the profile of the user in the application.

According to another preferred embodiment of the invention, the application provides for an application tutorial that provides information regarding the use of said application by means of images. The user may view the tutorial at the beginning of using of the application or any time later.

According to yet another preferred embodiment of the invention, the user may select appropriate settings for the profile. The settings of said application include, but not limited to, Set the passcode for the profile;
Set passcode to some specific folders;
Change the theme;
Decide with regard to how long the information shall be retained on the device;
Check when the last backup of the information was performed;
How many notes have been saved on the application;
How much space is being used by the user;
Set the default folder to receive incoming notes;
Disable the Pop-up feature of the application;
Decide the content for view in PDF and printing;
Create a manual backup on the device; and
Delete the profile.

According to a preferred embodiment of the invention, the application provides for a pop up/swipe down manager that triggers the background services of said application automatically each time an information is selected, copied or shared thereby preventing copying and pasting of information manually without any interruption. Said pop up/swipe down may be turned on or turned off as per the requirement of the user.

According to another preferred embodiment of the invention, the information may be segregated in the application in various categories that include, but not limited to: Reminder; Archive and Calendar.

The user may save the information in the said categories by selecting it in the application. With regard to the information saved under the category of reminder and calendar, the user receives notification at the selected time by way of message on registered mobile number or Email.

According to yet another preferred embodiment of the invention, the application allows the user one point solution to share the information in different platforms that include, but not limited to, Facebook; Twitter; WhatsApp; SMS; and Email.

According to a preferred embodiment of the invention, the application provides for automatically saving the information received by the user from the registered Email ID of the user having registered account on said application.

According to another preferred embodiment of the invention, the application renders the stylizing or formatting of the information saved in the application by means including, but not limiting to, Bold; Italics; Underline; Undo/Redo; Merge/Append; and Spell check.

According to yet another preferred embodiment of the invention, the information saved in the application may be arranged in various folders that include, but not limited to: Incoming; Personal; Work; and any other folder created by said user.

Said individual folders may be protected by way of a 4 digit password.

According to a preferred embodiment of the invention, the information that may be saved and shared in the application include, but not limited to, Photos; Word files; Excel files; PowerPoint files; pdf files; Notes; Audio; and Video. Said information saved in the application may be utilized for future reference, use, export, print and share.

According to yet another embodiment of the invention, the application provides for operations that include, but not limited to: Move; Copy; Delete; Merge content; Add tags; and Share.

Said application automatically recognizes links such as phone numbers, email IDs, websites and GPS coordinates.

According to a preferred embodiment of the invention, the information saved in the application may be shared with one or more registered contacts of said user. The information saved in the category of reminder or calendar of the user shall create same reminder and calendar and shall be shared in the same category of the other registered contacts.

According to another preferred embodiment of the invention, the application provides for creation of a broadcast list by the user for registered contacts including, but not limiting to, Employees; Vendors; Suppliers; Clients; Customers; Students; Teachers; and Partners.

The user is able to establish a communication channel for the purpose of sharing information at regular intervals. The user may also create groups in the application for regular interaction; collaborative working opportunities in real time.

According to yet another preferred embodiment of the invention, the application provides for managing the sources or platforms from where the information is retained in the application. Said platforms or sources include, but not limited to, Email; Facebook; LinkedIn; SMS; Tumblr; Twitter; Website; WhatsApp; and Others. The sources or the platforms may be created and edited by the user in the application.

According to a preferred embodiment of the invention, the application manages the registered contacts of the user by way of creating lists that include, but not limited to, Application Contact List; Phone Contact List; and Broadcast List. The user may block and unblock a contact as well as add, edit and delete the contact as per the requirement of the user.

Reference is hereby made to Patent Application Nos. 201611034293 and 201611036726.

Description of the Invention

The present invention relates to a method of storing and sharing data in an application configured for a device, said method comprising the steps of: installing said application; creating a profile of a user on said application; providing personal details of said user; verification of the user; determining appropriate settings for said profile; accessing distinct social media platforms; copy relevant data from said platforms; and saving or sharing said data; characterized in that a pop up/swipe down appears each time said user save the data in said device.

The instant invention enables users to save the information or data that is copied or shared as Reminders, Archive, or Calendar directly from the various social networking platforms through a POP-UP window appearing in a single click. The ease and efficient management of information or data from any social networking platform may be highlighted by the fact that the user is only required to select the information or data and click copy or share. Said action of the user triggers the opening of a POP-UP or swipe down window through the application.

The POP-UP window leads to a homepage of said application. The user may directly choose the source, category, folder and tags available in the homepage of the application for the information or data that is saved in the POP-UP window. The information or data hence saved may be analysed, formatted, exported, converted to PDF, printed, or shared across distinct social networking platforms with very few taps. The application allows the user to create a folder or tag in respect of the information or data saved.

The instant invention provides for another unique feature for sharing the saved information or data. The information or data may be edited as per the convenience and requirement of the user and may be shared further across different platforms.

The saved information could be converted into pdf format or printed too. The folders of information could be merged. The said application also provides for an option for printing the saved information.

The instant invention provides for an option of multiple sharing of the saved information or data. The saved information or data may be shared to multiple social networking platforms as well as to other platforms including emails at the same time. Said information or data may be shared post formatting or in the original format. Different levels of security of the information or data is made available through the application. The pass-code protection is provided to the information or data that is saved by the user as well as the folders of the user may be protected individually by way of assigning a password to said folders. Moreover, the information or data shared is in encrypted form and may be accessed only after decryption. SocioRAC gives separate areas to save, organize and manage one's personal content and for every organization of which you are a part of that is using SocioRAC to manage its content. It is essentially multiple mobile apps in one. Each organization will have a separate identical section on SocioRAC with full features and functionality, saving from the hassle of dealing with multiple apps and providing all the content at one place for more efficient, time saving and stress-free management.

The flow charts attached illustrates the logics followed and the basis of working of the present invention. Said flowcharts further indicates the screen display that is the outcome of the options chosen by the users and the entire logic flow of the application. Every aspect of the application is covered through the drawings and a complete idea of how the application achieves all the features is depicted. The flowcharts also illustrates the steps to be followed in order to add or remove pass-code; add a new folder or a new tag or a new source; add or edit certain contents in the application; merge the content that is saved; and printing and sharing the content.

FIG. 1 illustrates various options available in the application in order to manage the folders by the user. The user may either add a folder or edit an existing folder. Adding of a new folder may be performed by clicking on the option of "ADD FOLDER" followed by entering and saving the details to the folder. Editing of the existing folder may be performed by selecting the option of "EDIT FOLDER" and then making alterations and saving the same. The user may also delete a specific folder by way of "DELETE FOLDER" and then confirming the command.

Figure 2:
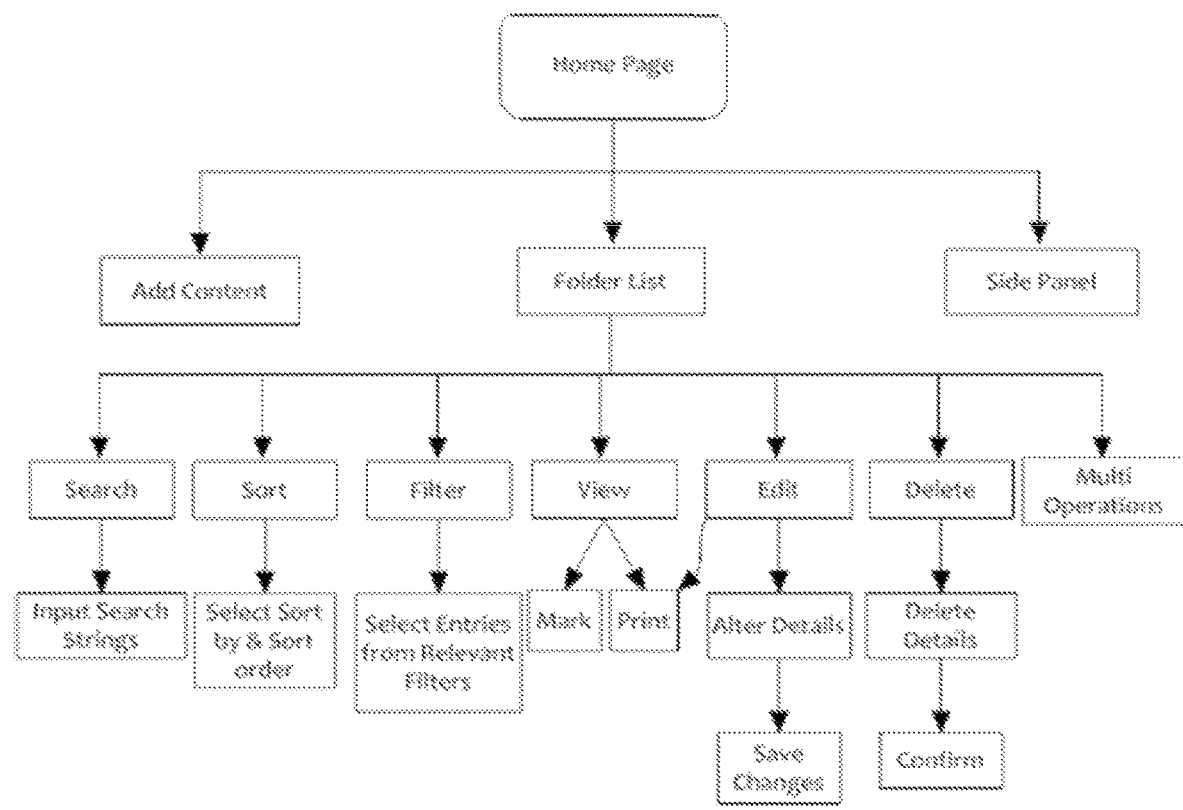
FIG. 2 is a schematic view of an embodiment of the present invention, depicting various options available on the homepage of the application.
Figure 3:
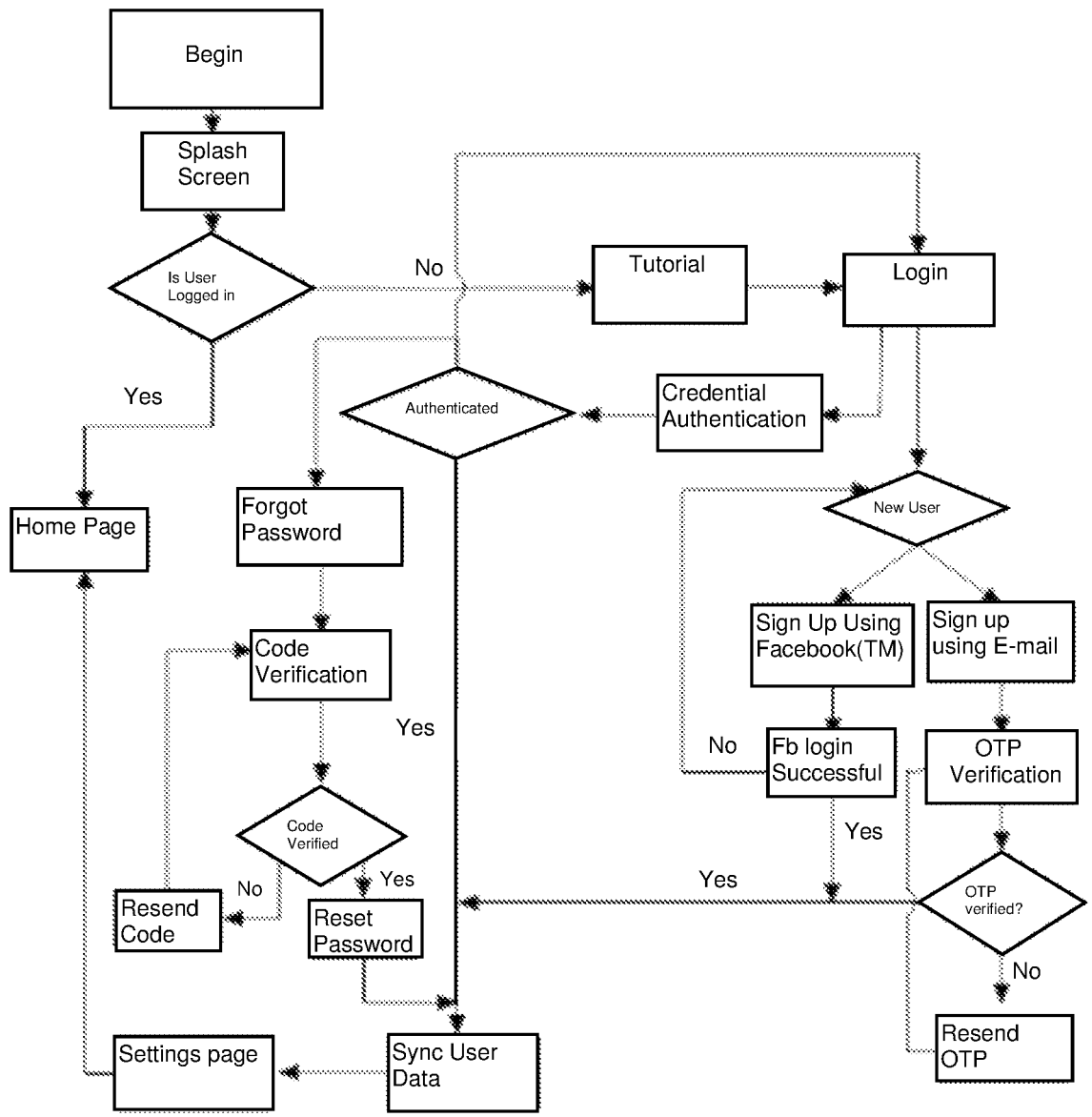
FIG. 3 is a schematic view of an embodiment of the present invention, illustrating the method of registration in the application.

FIG. 2 depicts the homepage of the application. Said page displays the options of "ADD CONTENT", "FOLDER LIST" and "SIDE PANEL". The application allows the addition of content by clicking on "ADD CONTENT" and providing the details and saving said details. The FOLDER LIST comprises of "CONTENT LIST" that is further categorized into the following category:
 1 LIVE SEARCH: Performs live search of the search string provided by the user.
 2 SORT: Sort out the information or data selected by the user.
 3 FILTER: Filters the entries as selected by the user.
 4 VIEW: Said category provides the option of Marking and Printing the selected information or data.
 5 EDIT: Formats the saved information or data.
 6 DELETE: Deletes the information or data saved by the user.
 7 MULTI-OPERATIONS FIG. 3 illustrates the method of registration or signing up in the application. The method comprises the following steps:
 1 The user may sign up in the application with Facebook or Email by clicking on "SIGN UP".
 2 The user is required to provide the personal details that include name, Email, 2 Mobile Number and the Password and further select the gender, country and the city followed by clicking on "SignUp".
 3 A verification code is sent to the Email address provided by the user in the second step while signing up.
 4 Copy the code and paste the same in the application or may verify the Email ID by clicking on the link provided in the verification mail.
 5 Pursuant to signing up in the application the user sign in the application that shall lead to the Homepage.

Figure 4:
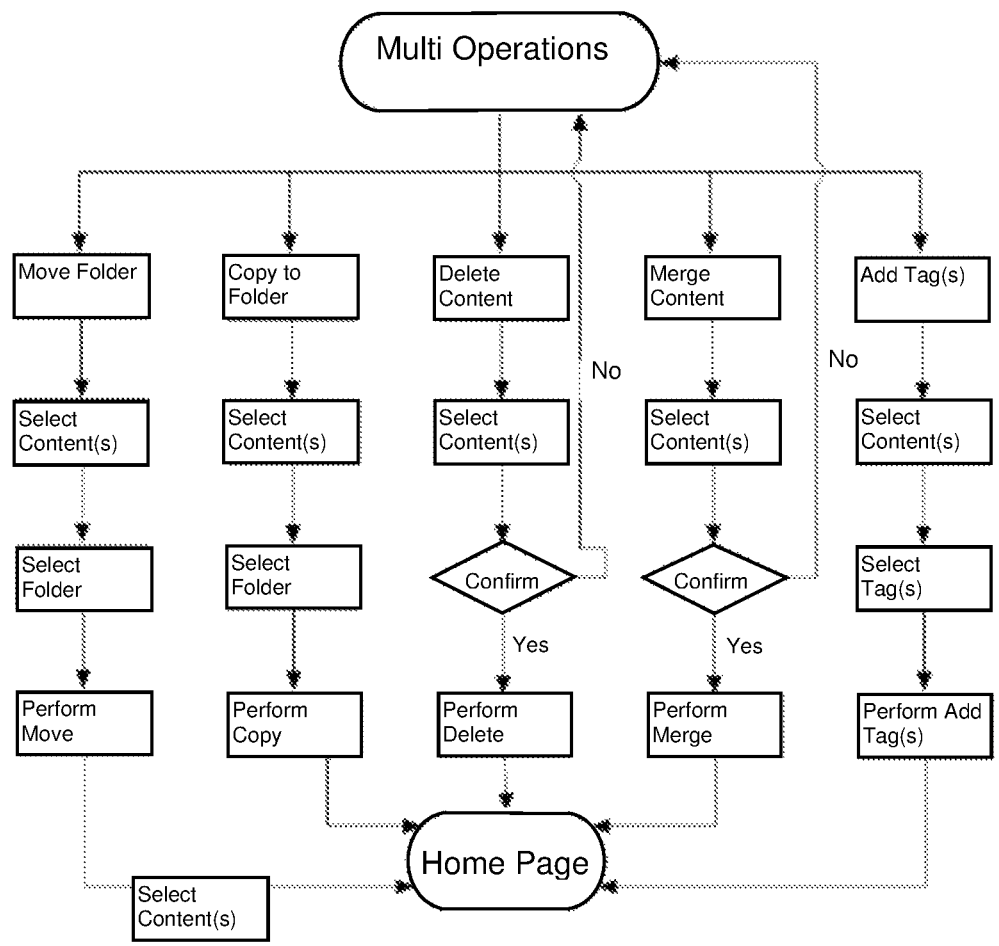
FIG. 4 is a schematic view of an embodiment of the present invention, depicting the multi-operations that are made available to the user through the application.

FIG. 4 depicts the different options available under the category of Multi-Operations. Said options include:
 1 MOVE TO FOLDER: The user may transfer the information or data to a specific folder by selecting the content and the folder followed by clicking MOVE.
 2 COPY TO FOLDER: The application allows the user to copy the information or data to a specific folder by selecting the information saved and the folder and clicking COPY.
 3 DELETE CONTENT: The saved information or data may be deleted by selecting the content, clicking DELETE option and confirming said command.
 4 MERGE CONTENT: Said feature of the application aids the user to merge the saved information or data by selecting the contents that are required to be merged, clicking on MERGE and confirming the same.
 5 ADD TAGS: Tags may be added to the selected information or data by selecting tags followed by performing TAGS.

Figure 5:
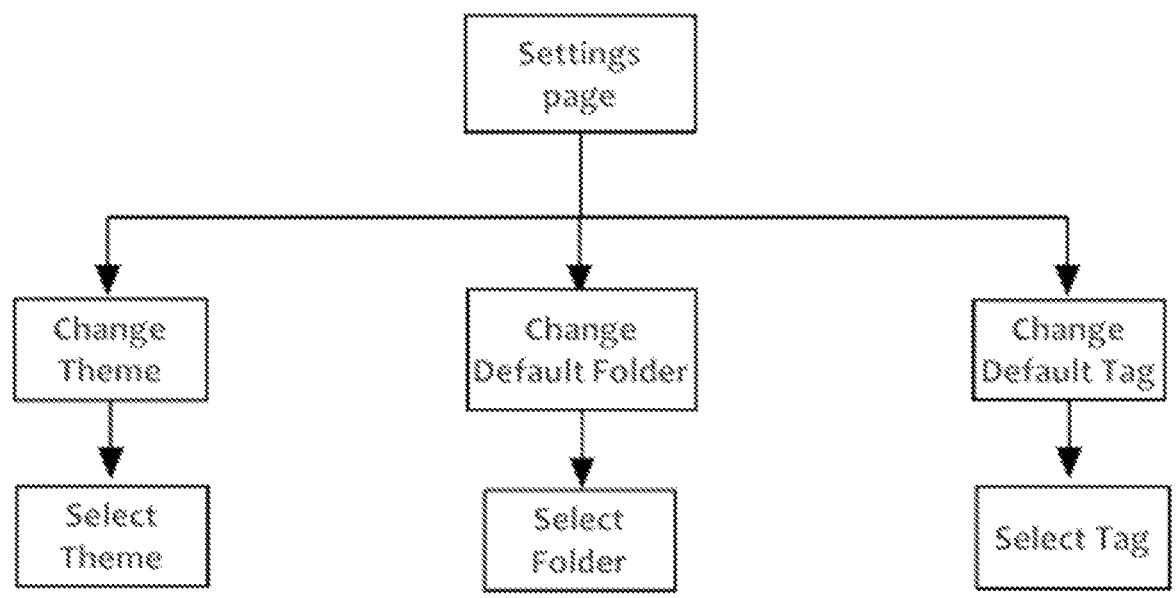
FIG. 5 is a schematic view of an embodiment of the present invention, illustrating the settings of the application.

FIG. 5 illustrates the settings page of the application. The following options are displayed on said page:
 1 CHANGE THEME: The theme of the application may be changed by selecting a theme available in the application.
 2 CHANGE DEFAULT FOLDER: The user may change the default folder by selecting the folder that is required to be made as default folder.
 3 CHANGE DEFAULT TAG: The tags may be altered by the user by selecting a particular tag.

Figure 6:
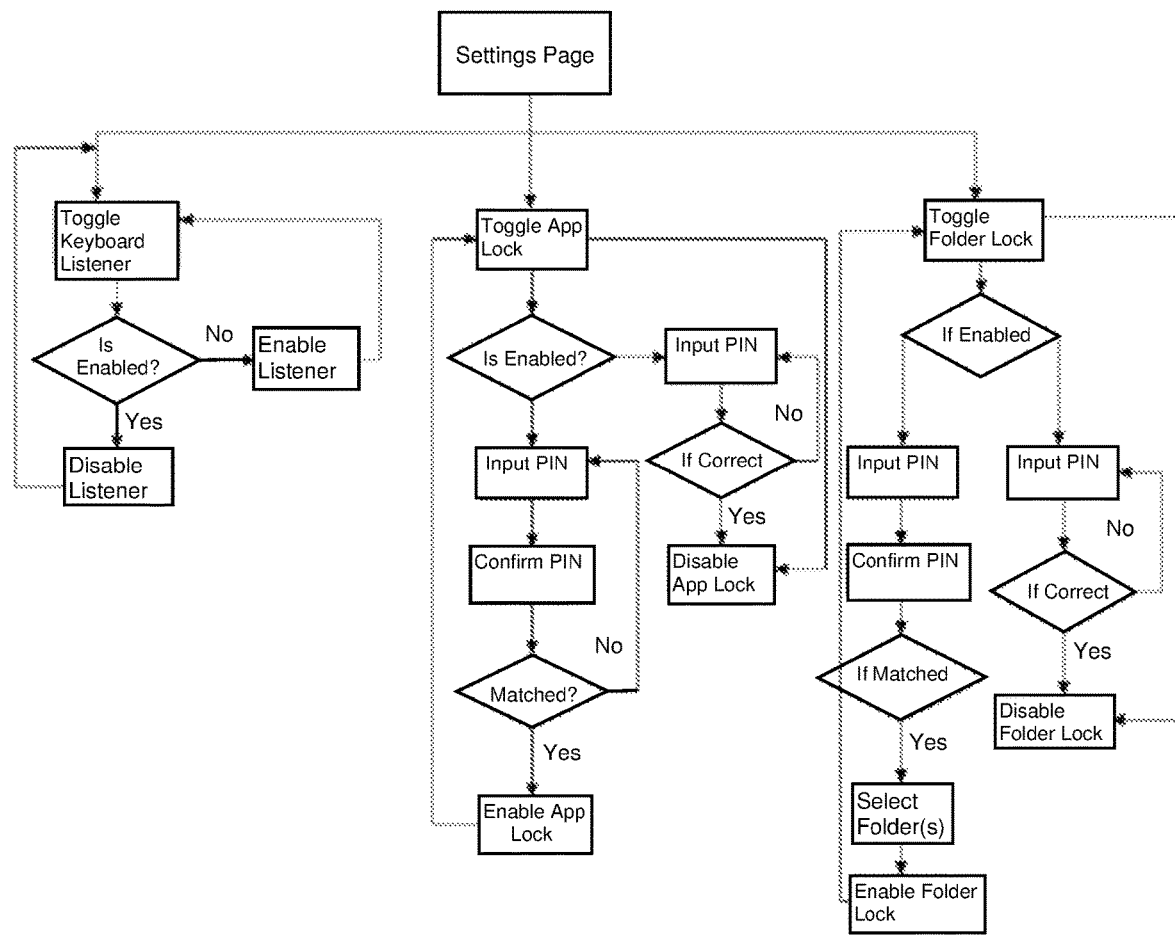
FIG. 6 is a schematic view of an embodiment of the present invention, illustrating the advanced settings of the user profile on the application.
Figure 7:
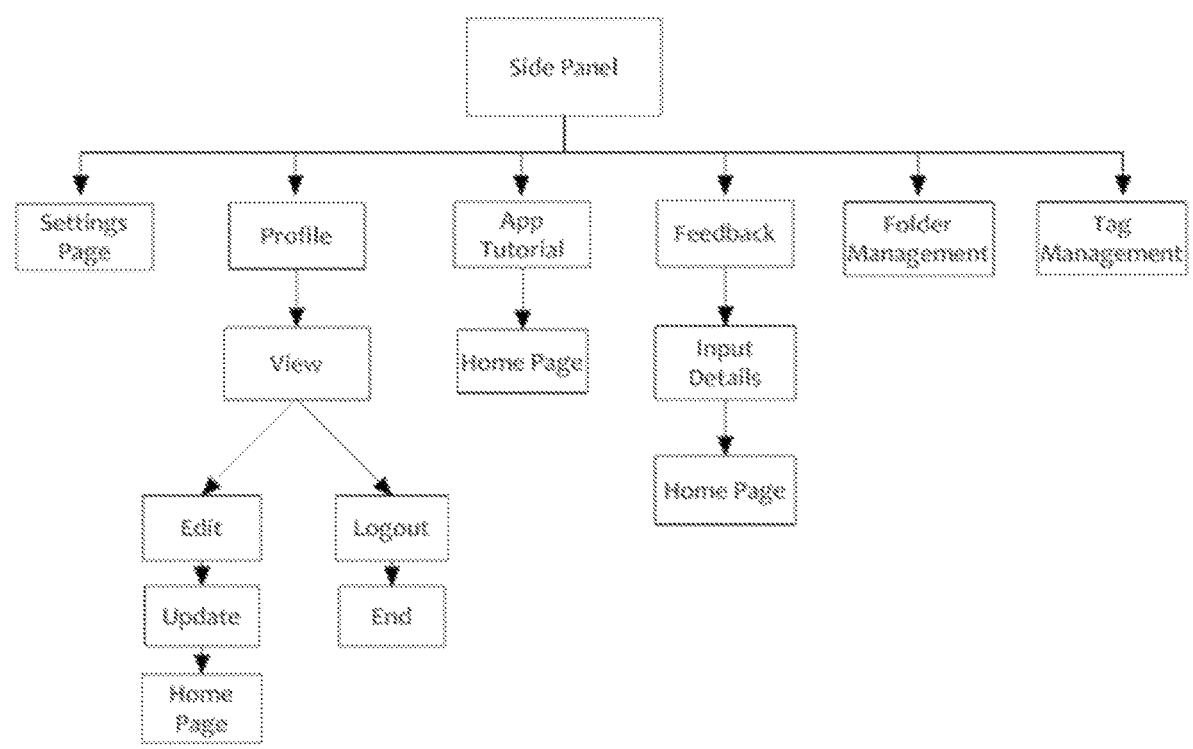
FIG. 7 is a schematic view of an embodiment of the present invention, depicting the options available on the side panel of the application.
Figure 8:
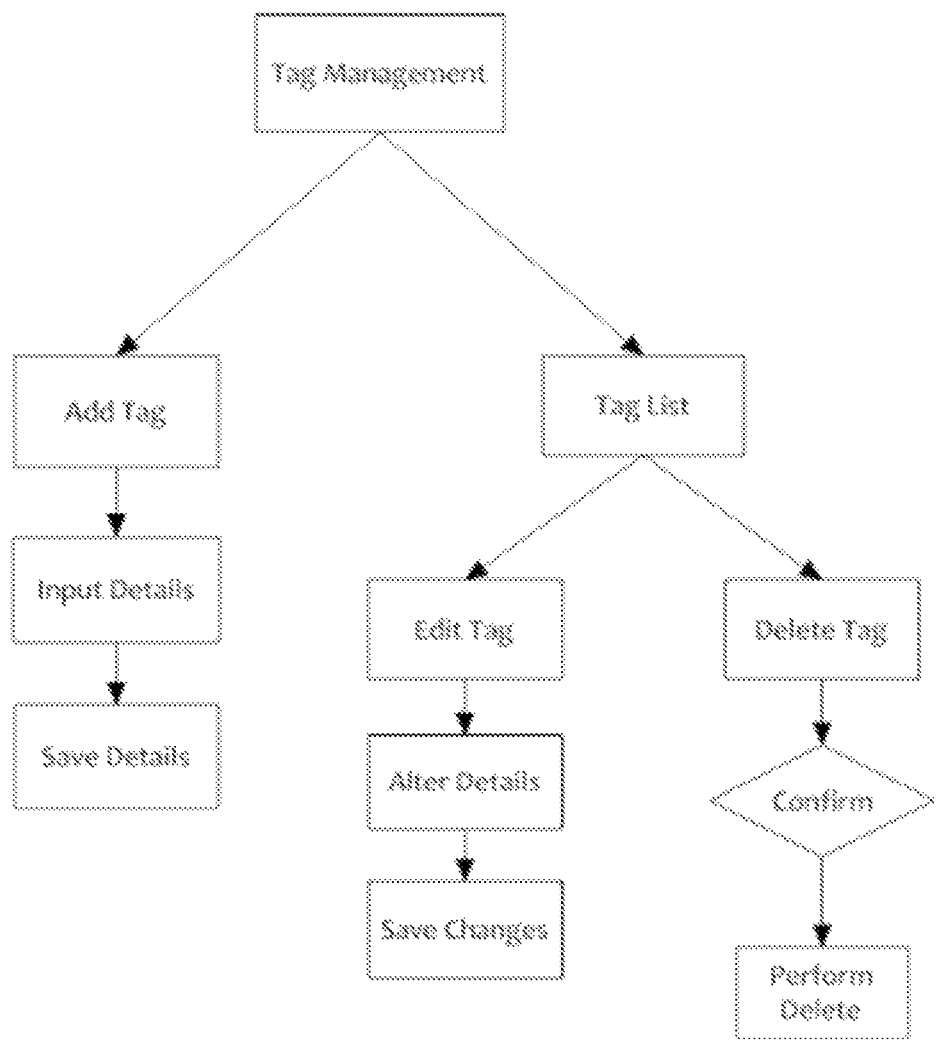
FIG. 8 is a schematic view of an embodiment of the present invention, illustrating the tag management in the application.

FIG. 6 depicts detailed Settings page of the application that include the following:
 1 Enabling passcode to secure the application and setting the passcode
 2 Putting passcode to specific folders
 3 TOGGLE CLIPBOARD LISTENER
 4 TOGGLE APP LOCK
 5 TOGGLE FOLDER LOCK
 6 How long the information or data is required to be retained on the device
 7 When the last backup to the cloud was performed
 8 Number of noted notes
 9 How much space is being used by the application
 10 Disable the Pop-up
 11 Decide the content for view in PDF and printing
 12 Create a manual backup on the device and restoring the same FIG. 7 describes the side panel page of the application that provides for the following options:
 1 SETTING PAGE
 2 PROFILE: The user may view the profile created while signing up in the application and may EDIT the same or may LOGOUT from said profile.
 3 APP TUTORIAL: Said feature provides for a method for using the application.
 4 FEEDBACK: The user may provide feedback with regard to the functioning and efficiency of the application.
 5 FOLDER MANAGEMENT
 6 TAG MANAGEMENT FIG. 8 illustrates the process of tag management in the application. The tags may be organized by the user using the following:
 1 ADD TAG
 2 TAG LIST: Said feature is further categorized to "EDIT TAG" and "DELETE TAG". By EDIT TAG, the user may alter the details of a specific tag while DELETE TAG allows the user to delete a tag.

Figure 9:
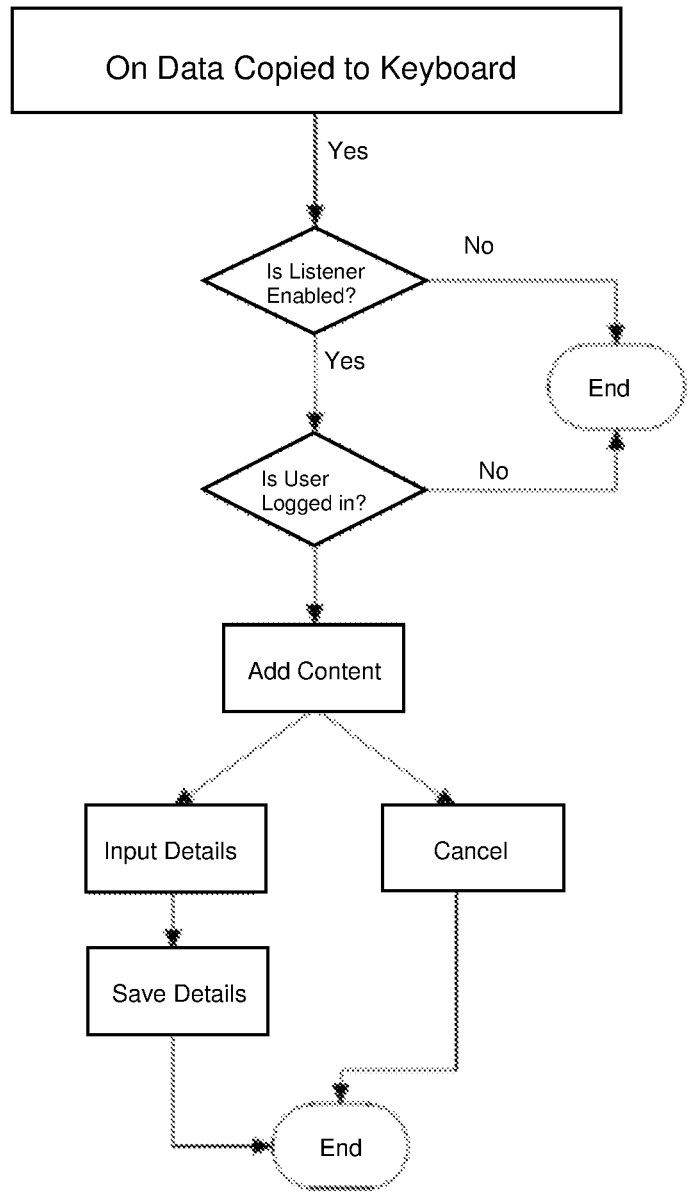
FIG. 9 is a schematic view of an embodiment of the present invention, illustrating the pop up feature logic.

FIG. 9 illustrates the Pop up settings as provided by the application. Said feature aids the user to enable or disable the opening up of the pop up window as per the requirement.

Figure 10:
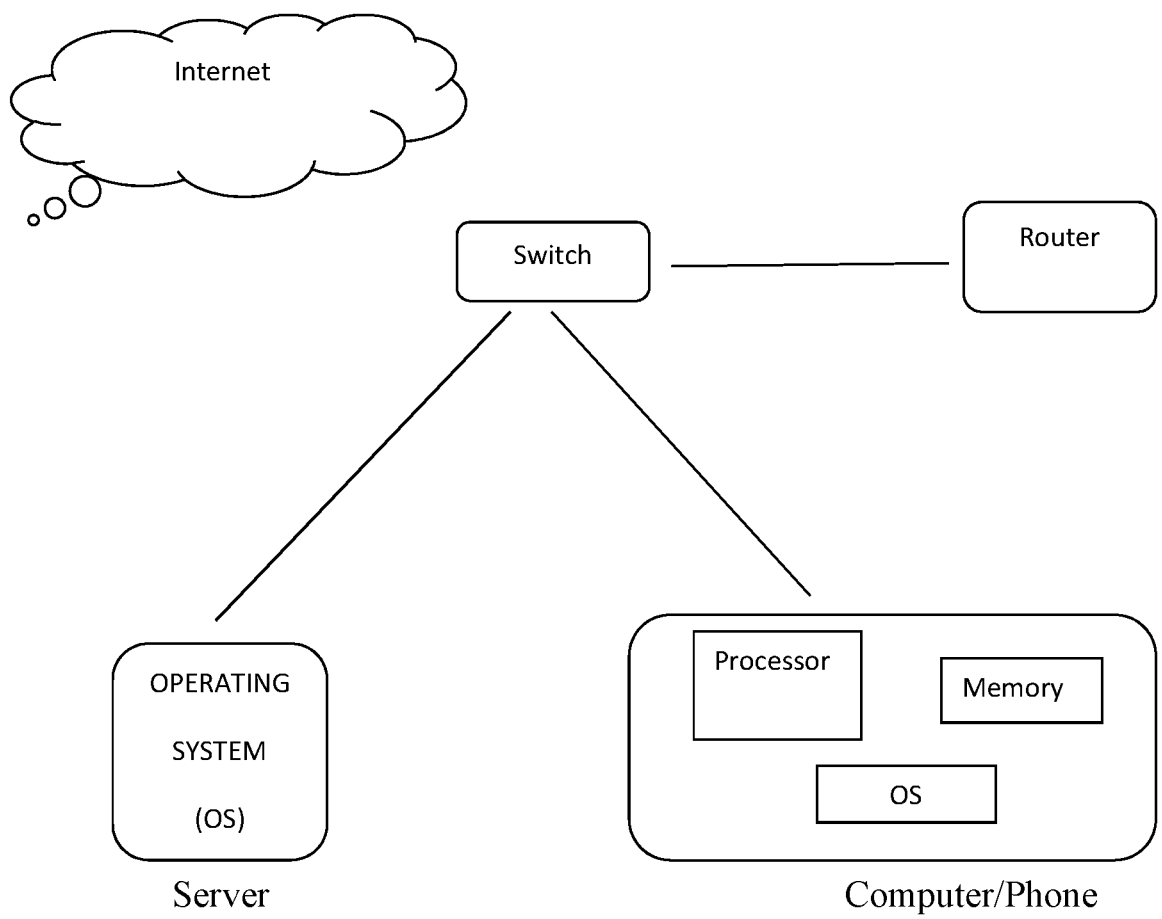
FIG. 10 is a schematic view of an embodiment of the present invention, illustrating the schematic diagram of the system.

FIG. 10 illustrates the system comprising a server, computing device with a processor, memory and an operating system that performs the pop-up feature logics, and a network.

I claim:

1. A method of managing digital assets, the method comprising the steps of:
    installing an application on a device;
    creating a profile of a user on said application;
    providing personal details of said user;
    verifying said user;
    determining appropriate settings for said profile;
    accessing a first social networking platform and a second social networking platform, said first social networking platform being different from said second social networking platform;
    recognizing a first digital asset of a first digital asset group in said first social networking platform and a second digital asset of a second digital asset group in said first social networking platform, said first digital asset group being different from said second digital asset group;
    determining a first tag associated with said first digital asset and said second digital asset in said application;
    associating said first digital asset and said second digital asset with other digital assets recognized with said application having said first tag;
    sorting said first digital asset, said second digital asset, and said other digital assets recognized with said application having said first tag, according to said first tag;
    copying first data from said first digital asset of said first digital asset group from said first social networking platform; and
    saving or sharing said first data into a third digital asset of said first digital asset group in said second social networking platform, wherein the step of saving or sharing said first data comprises the step of opening a pop up/swipe down window.

2. The method, as claimed in claim 1, further comprising the step of:
    managing said pop up/swipe down window by a pop up/swipe down manager; and
    triggering background service of said application during the step of opening of said pop up/swipe down window so as to save said first data.

3. The method, as claimed in claim 1, further comprising the step of: encrypting said first data in said application.

4. The method, as claimed in claim 1, further comprising the step of: retrieving said first data in said application by said first tag.

5. The method, as claimed in claim 1, further comprising the step of:
    determining a second tag associated with said first digital asset in said application; and
    determining a third tag associated with said second digital asset in said application.

6. The method, as claimed in claim 1, wherein said profile is comprised of contacts of said user, the method further comprising the step of: sharing said first data with a contact of said profile.

7. The method, according to claim 1, wherein said first digital asset group comprises one of a group consisting of audio files, audio/video media files, digital asset containers, digital media files, directories, disk drives, e-mails; files, folders, instant message logs, pictures, removable storage media, video files, voice mails, webpages, and webpage URLs.

8. The method, according to claim 1, wherein said second digital asset group comprises one of a group consisting of audio files, audio/video media files, digital asset containers, digital media files, directories, disk drives, e-mails; files, folders, instant message logs, pictures, removable storage media, video files, voice mails, webpages, and webpage URLs.

9. The method, according to claim 1, further comprising the steps of:
    recognizing said third digital asset of said first digital asset group in said second social networking platform;
    associating said third digital asset with said first tag; and
    sorting said third digital asset, said first digital asset, said second digital asset, and said other digital assets in said application with said first tag, according to said first tag.

10. The method, according to claim 1, further comprising the step of:
    saving or sharing said first data into a fourth digital asset of said second digital asset group in said second networking platform.

11. The method, according to claim 10, further comprising the steps of:
    recognizing said fourth digital asset of said second digital asset group in said second social networking platform;
    associating said fourth digital asset with said first tag; and
    sorting said fourth digital asset, said third digital asset, said first digital asset, said second digital asset, and said other digital assets in said application with said first tag, according to said first tag.

* * * * *